(12) United States Patent
Rolle et al.

(10) Patent No.: US 9,709,345 B2
(45) Date of Patent: Jul. 18, 2017

(54) APPARATUS FOR INFLUENCING THE OUTFLOW REGION OF A TUBE CARRIER PLATE OF A TUBE BUNDLE HEAT EXCHANGER

(71) Applicant: GEA TDS GmbH, Sarstedt (DE)

(72) Inventors: Ulrich Rolle, Everswinkel (DE); Günter Lütkebruns, Gronau-Epe (DE); Uwe Schwenzow, Ahaus (DE); Hubert Assing, Ahaus (DE); Markus Grimm, Klein-Zecher (DE); Ralf Speemann, Altenberge (DE)

(73) Assignee: GEA TDS GmbH, Sarstedt (DE)

( * ) Notice: Subject to any disclaimer, the term of this patent is extended or adjusted under 35 U.S.C. 154(b) by 60 days.

(21) Appl. No.: 14/900,749

(22) PCT Filed: May 30, 2014

(86) PCT No.: PCT/EP2014/001469
§ 371 (c)(1),
(2) Date: Dec. 22, 2015

(87) PCT Pub. No.: WO2014/202182
PCT Pub. Date: Dec. 24, 2014

(65) Prior Publication Data
US 2016/0153728 A1 Jun. 2, 2016

(30) Foreign Application Priority Data
Jun. 22, 2013 (DE) .......................... 10 2013 010 460

(51) Int. Cl.
*F28F 9/22* (2006.01)
*F28F 9/02* (2006.01)
(Continued)

(52) U.S. Cl.
CPC ............ *F28F 9/0282* (2013.01); *A23L 3/001* (2013.01); *F28D 7/16* (2013.01); *F28D 7/1669* (2013.01);
(Continued)

(58) Field of Classification Search
CPC .... F28F 9/22; F28F 9/02; F28F 9/0265; F28F 9/0282; F28D 7/0066; F28D 9/0006;
(Continued)

(56) References Cited

U.S. PATENT DOCUMENTS 6,668,914 B2 * 12/2003 Langl .................... F28D 7/0066
165/145
6,896,042 B2 * 5/2005 Inoue ........................ F28F 9/02
165/145
(Continued)

FOREIGN PATENT DOCUMENTS

DE 19 62 951 U 6/1967
DE 34 03 848 U1 6/1994
(Continued)

*Primary Examiner* — Davis Hwu
(74) *Attorney, Agent, or Firm* — Young Basile Hanlon & MacFarlane, P.C.

(57) ABSTRACT

An apparatus for influencing the outflow region of a tube carrier plate of a tube bundle heat exchanger, in particular for the food and beverage industry, and more particularly for temperature-sensitive and/or viscous food products in the dairy industry, for example desserts, sauces or concentrates, is described. The apparatus operates so that the tendency for deposits to form in the region of the tube carrier plate through which product flows out is reduced. An annular space-like outlet channel has, at least overall in the region thereof between a maximum outside diameter of an outlet-side displacement body and a second connection opening, a channel passage cross-section, which has a constant cross-section over the entire length of the region and which corresponds to a total cross-section of all of the inner tubes
(Continued)

through which a product flows in parallel, which inner tubes each have an individual cross-section.

15 Claims, 4 Drawing Sheets

(51) Int. Cl.
    *A23L 3/00*     (2006.01)
    *F28D 7/16*     (2006.01)
    *F28D 21/00*     (2006.01)

(52) U.S. Cl.
    CPC .............. *F28F 9/02* (2013.01); *F28F 9/0265* (2013.01); *F28D 2021/0042* (2013.01); *F28D 2021/0098* (2013.01)

(58) Field of Classification Search
    CPC .. F28D 7/16; F28D 7/1669; F28D 2021/0042; F28D 2021/0098
    USPC ........................................................ 165/145
    See application file for complete search history.

(56) References Cited

U.S. PATENT DOCUMENTS

| | | | |
|---|---|---|---|
| 6,918,433 B2* | 7/2005 | Kontu | .................. F28F 9/22 165/135 |
| 9,127,893 B2 | 9/2015 | Zimmerman et al. | |
| 2001/0045273 A1* | 11/2001 | Langl | ............... F28D 7/0066 165/145 |
| 2002/0043363 A1* | 4/2002 | Carpentier | ............ F28D 9/0006 165/166 |
| 2012/0276266 A1 | 11/2012 | Tacke et al. | |

FOREIGN PATENT DOCUMENTS

| | | |
|---|---|---|
| DE | 34 03 913 U1 | 6/1994 |
| DE | 103 11 529 B3 | 9/2004 |
| DE | 10 2005 059 463 A1 | 6/2007 |
| DE | 10 2008 038140 A1 | 2/2010 |
| WO | 2011085784 A2 | 7/2011 |

\* cited by examiner

# APPARATUS FOR INFLUENCING THE OUTFLOW REGION OF A TUBE CARRIER PLATE OF A TUBE BUNDLE HEAT EXCHANGER

TECHNICAL FIELD

The disclosure relates to an apparatus for influencing the outflow region of a tube carrier plate of a tube bundle heat exchanger, in particular for the food and beverage industry, and in this case in particular for temperature-sensitive and/or viscous food products in the dairy industry, for example desserts, sauces or concentrates.

BACKGROUND

Indirect product heating, for example in Ultra-High Temperature (UHT) systems by a heat exchange on a wall can take place both with so-called plate heat exchanger systems or also, as in the description herein, with so-called tube bundle heat exchangers, in which thermal energy is transferred by the tube walls of a group of inner tubes. The food product to be treated thereby flows in the inner tubes, while a heat carrier medium, in general water or vapor, flows in the annular gap space of the casing tube, which surrounds the parallel-connected inner tube. This type of tube bundle heat exchanger is known from DE 94 03 913 U1.

Particularly temperature-sensitive products, like for example desserts, sauces or concentrates, in particular with a high viscosity and, if applicable, with solid-containing components like entire pieces, pulp or fibers, require an exact and quick temperature adjustment of the product for the required temperature conditions. Moreover, a thermally or mechanically gentle treatment of the product is simultaneously required. It follows from the requirement for a thermally gentle treatment that all partial quantities of a product to be subjected to heat treatment pass through the same required temperature level progression at the same time and over the same period of time. In other words, this means that all partial quantities are subject to the same thermal and flow-mechanical conditions at the same retention time.

Mechanically gentle treatment means that the mechanical load of the product is held as low as possible. This type of load always occurs in particular when the product is subject to shear forces. The latter notoriously occur during deflections, discontinuous cross-sectional transitions, branchings and mergings of the flow ducts.

DE 103 11 529 B3 addresses the branching problem of the flow in the inlet area of the tube bundle plate of a tube bundle heat exchanger (e.g., DE 94 03 913 U1), as preferably used in UHT systems. The targeted measures suggested under the conceptual formulation specified there relate exclusively to the branching of a product into inner tubes of the tube bundle heat exchanger receiving a number of partial quantities of this product, wherein among other things a displacement body is provided, which is arranged axially symmetrically and concentrically to the tube carrier plate. This thus relates exclusively to an apparatus for influencing the inflow region of a tube carrier plate of a tube bundle heat exchanger in question. The inner tubes are thereby distributed over the entire circular area of the tube carrier plate, generally on more than one pitch circle, exclusively of a narrowly restricted central region. Under these prerequisites, there are, from the outset both in the inlet as well as in the outflow region of the respective tube carrier plate, thus during the branching and the merging of the flow, flow paths with different lengths to the inlet into the inner tubes or respectively from the outlet out of them. For this reason alone, different retention times result for the partial quantities of the product flowing through the respective inner tubes.

As shown in the description of DE 103 11 529 B3, the cross-section-like design of the tube bundle heat exchanger generally takes place such that the average flow speed in the inner tube is also present in a connection bend, which is connected on one side with a fixed-bearing-side exchanger flange and on the other side indirectly with a loose-bearing-side connecting piece permanently connected with a loose-bearing-side tube carrier plate. The flow mechanical design of the flow pull between the connection bend and the inlet into the inner tubes in the fixed-bearing-side tube carrier plate is defined by the following characteristics. Namely, the flow supplied via the connection bend with the average flow speed is accelerated in an annular gap cross-section narrowed in a nozzle-like manner, which is formed between the displacement body and the fixed-bearing-side exchanger flange. The resulting flow speed reaches its maximum flow speed in a minimum annular gap cross-section (narrowest point of the annular gap cross-section). Behind the narrowest point of the annular gap cross-section, the latter extends as a result of an extending passage cross-section because this extension cannot be compensated to the same degree by a front part of the displacement body, which expands in the inflow direction. The flow thus experiences a delay behind the narrowest point of the annular gap cross-section. The flow breaks away as expected at a flow break point at, for example, the greatest outside diameter of the front part of the displacement body. Behind the flow break point, the cross-section of the displacement body is reduced in a rear part continuously down to a minimum cross-section of a shaft, so that a continuously expanding passage cross-section is available for the flow in cooperation with the expanding passage cross-section. The flow is thus further delayed in the region of the rear part of the displacement body until it enters the inner tubes with the average flow speed.

In order to solve the problem described above of different retention times during the branching and merging of the flow, WO 2011/085784 A2 suggests arranging all inner tubes of the tube bundle in a circular-ring-shaped manner on a single circle and in an outer channel of the tube bundle heat exchanger designed as an annular space. The inner tubes, flowed through in parallel, extend in the longitudinal direction of the outer channel and are each supported on the end side in a tube carrier plate.

This arrangement of the inner tubes is combined with respectively one axially symmetrical displacement body permanently arranged concentrically on the tube carrier plate at the inlet and the outlet of the product. The respective displacement body reaches centrally through an exchanger flange associated with the tube carrier plate, wherein the exchanger flange has a connection opening on its side facing away from the associated tube carrier plate, which preferably opens axially symmetrically via a transition, preferably designed in a conical or cone-shaped manner, free in particular of points of discontinuities up to an extended passage cross-section provided on the end side. With an inner contour formed by the connection opening, the conical or cone-shaped transition and the extended passage cross-section, the respective displacement body forms an annular space-like channel, which extends continuously from the connection opening to the tube carrier plate in its respective annular gap cross-section. The end-side areas of the known tube bundle heat exchanger are each designed as mirror images of each other and with the same dimensions, at least respectively in connection with the outer channel, wherein this symmetry also expressly includes the two displacement bodies and the two annular space-like channels.

Almost congruent flow paths and mainly uniform heat transfer conditions thereby result in all relevant areas of the tube bundle heat exchanger for all partial quantities of the product branching and merging into the inner tubes between the product inlet and outlet.

However, congruent flow paths do not simultaneously mean that the flow pulls of the individual partial quantities are constructed with an unchanged flow speed, which avoids acceleration or respectively delay. As shown in the description of WO 2011/085784 A2, a first annular channel in the first exchanger flange (region of the product inlet; inlet side) and a second annular channel in the second exchanger flange (region of the product outlet; outlet side) and thus the associated flow speeds change respectively continuously and bounce-free. As a result, each of the partial quantities branched on the outlet side flow out of the inner tubes of the second tube carrier plate into a second inlet groove with a third flow speed. A delay to a minimum value of the unbranched flow then takes places in the course of the merging of the partial quantities in the largest annular gap cross-section of this second inlet groove, a second flow speed, and the unbranched flow is finally accelerated in the annular second channel to a first flow speed in the second connection opening.

SUMMARY

With respect to the formation of deposits on the tube carrier plates, it has been shown in practical operation of the apparatus described above that, in the case of the heating of viscous dairy products, for example concentrates, the symmetrical flow geometry shown above does not lead to service-life-impacting deposits on the inlet-side and flowed-against tube carrier plate, but does lead to such deposits on the outlet-side, flowed-off tube carrier plate. These deposits occur at the transition from the outlet of the inner tubes into the extended passage cross-section. In the region of the inlet-side tube carrier plate, this extended passage cross-section, located upstream seen in the direction of flow, which is formed from the passage cross-section on the product inlet through continuous extension, leads to a swirl formation in this area, which prevents the deposits at the inlet into the inner tubes and at the webs between the inner tubes. In the region of the outlet-side and flowed-off tube carrier plate, the extended passage cross-section located there, which then continuously reduces to the passage cross-section at the product outlet, leads to dead space areas, in which deposits preferably form in excess, whereby the service life of the tube bundle heat exchanger is reduced.

The object of the present invention is to develop an apparatus in such a way that the tendency for deposits to form at the second, outlet-side tube carrier plate and in the associated second, outlet-side exchanger flange is considerably reduced.

The present invention addresses the outlet side of the tube bundle heat exchanger, as described in its basic structure in WO 2011/085784 A2, and suggests solutions for this outlet side. As described herein, the inflow side of embodiments of the invention can be designed with an inlet-side displacement body and a resulting annular space-like inlet channel, as disclosed in WO 2011/085784 A2. However, this type of inlet-side design is not necessary; the omission of these types of inlet-side measures is possible. With the present invention, a thermally particularly gentle treatment with the same retention time for all partial quantities of the product and the mechanical load of which is to be kept as low as possible are ensured.

The invention includes a tube bundle heat exchanger according to WO 2011/085784 A2 with at least one tube bundle, which consists of a group of inner tubes connected in parallel and each flowed through by the product on the inside, which are arranged in a circular-ring-shaped manner on a single circle and in an outer channel designed as an annular space and extend in its longitudinal direction. As further described herein, the inner tubes are each supported on the end side in a first and a second tube carrier plate. The outer channel for a heating medium is restricted on the outside by an outer casing and on the inside by an inner casing. The number of inner tubes flowed through in parallel by the product forms together an inner channel. The inner channel is provided with a product inlet designed for all inner tubes together, on one side in a first exchanger flange, and with a joint product outlet designed on the other side in a second exchanger flange. A first and a second connection opening are arranged centrically in the first and in the second exchanger flange on its flange side facing away from the associated tube carrier plate. The second connection opening extends, opposite the direction of flow, axially symmetrically and radially in the second exchanger flange, continues up to an extended outlet-side passage cross-section provided on the end side and establishes a fluid-accessible connection to the inner tubes. An axially symmetrical outlet-side displacement body is arranged coaxially to the second connection opening and concentrically to the second tube carrier plate and is permanently connected with it. It forms an annular space-like outlet channel with an outlet-side inner contour formed by the second connection opening and its radial extension up to the extended outlet-side passage cross-section.

The invention abandons the known tenet of the annular space-like outlet channel, which tapers continuously toward the product outlet seen in the direction of flow, and designs the apparatus such that it has a channel passage cross-section at least everywhere in its region between a maximum outside diameter of the outlet-side displacement body and of the second connection opening that has a constant passage cross-section over the entire length of the defined region and corresponds in this region with a total passage cross-section of all, i.e., of the total provided number of inner tubes flowed through in parallel, each of which has an individual passage cross-section.

The most even possible, unchanged flow speed of the product, avoiding accelerations and delays, beginning at the outlet of the inner tubes in the second tube carrier plate up to the inlet into a connection bend connected to the second exchanger flange, results from this design. This means a constant passage cross-section over the entire length of the annular space-like outlet channel.

The outlet-side displacement body can thereby be provided with a definable axial engagement depth into the realized passage cross-section of the connection bend. This axial engagement depth also depends on whether the nominal passage cross-section of the connection bend, which is calculated from its nominal diameter and can deviate from the realized passage cross-section, corresponds with the total passage cross-section of all inner tubes flowed through in parallel or was selected to be somewhat larger, if applicable. In the case of the last-mentioned facts, a continuous adjustment of the flow speed in the annular space-like outlet channel for that in the realized passage cross-section of the connection bend can then take place via the axial engagement depth of the outlet-side displacement body.

Since it is advantageous to design the first and second exchanger flange with identical shapes and dimensions in order to reduce the number of parts, as provided by an advantageous embodiment, the measures for forming the annular space-like outlet channel manifest themselves in this case alone on the outlet-side displacement body.

In order to avoid a discontinuous enlargement of the passage cross-sections for the outflowing product, seen in the direction of flow, after the outlet from the inner tubes and namely already within the second exchanger flange and in the transition area to the annular space-like outlet channel, the maximum outside diameter of the outlet-side displacement body reaches at least up to the diameter of the circle, on which the inner tubes are arranged and overlaps this circle, if necessary. Through an annular surface formed between a displacement foot and the maximum outside diameter of the outlet-side displacement body, a volume-reducing boundary of a passage cross-section of an annular space is thereby reached before entry of the flow into the annular space-like outlet channel, whereby the formation of a uniform flow speed is ensured.

The best possible prerequisites for the concrete realization of congruent flow paths are created in that the inner tubes of the tube bundle are arranged in the largest possible circumferential area of the tube carrier plate. This design is preferably realized such that the gap width of the annular space is designed as small as necessary for sufficient circulation with the heating medium and such that the circle diameter, on which the inner tubes are arranged, is designed as large as possible.

In a further implementation, the inner tubes of the tube bundle are arranged evenly distributed over the perimeter of the circle. Thereby, and in connection with the dimension ratios described above, the flow paths from the unbranched total flow to the respectively branched partial flow into the inner tubes and vice versa are congruent.

The realization of the annular space-like outer channel succeeds very simply in that the outer channel designed as an annular space is restricted on the inside by an inner casing, which is restricted according to a first implementation in the shape of an inner tube or according to a second implementation in the shape of an inner rod, wherein the inner tube and the inner rod are respectively supported on the end side in the tube carrier plate. The inner tubes arranged on a single circle are thereby located in an equidistant annular space to be designed in a relatively narrow manner, in which there are neither dead spaces nor stagnating areas of the flow of the heating medium.

According to a further implementation, beneficial flow conditions in the outlet area of the inner tubes are ensured by designing the outlet-side displacement body in a mushroom-like manner, so that the outlet-side displacement body ends with its displacement foot directly on the second tube carrier plate and the maximum outside diameter of the outlet-side displacement body is reduced in a plane perpendicular to a symmetry axis of the outlet-side displacement body to an outside diameter of the displacement foot. The transition is advantageously rounded in a sufficient manner.

A stabilization of the passage cross-sections in the progression of the flow of the product from the outlet from the inner tubes to the inlet into the annular space-like outlet channel is ensured in that the annular space-like outlet channel merges into an annular space within the second exchanger flange on its extended passage cross-section, which is oriented coaxially to the symmetry axis, which is flush on the radial outside with an inner diameter of the extended outlet-side passage cross-section, which reaches on the radial inside up to the displacement foot, and which is delimited laterally by an annular surface formed between the displacement foot and the maximum outside diameter of the outlet-side displacement body, and in that the annular space has an axial annular space width that corresponds at least with one-fourth of a tube inner diameter of the inner tube. This type of design of the annular space width almost creates parity between the circular inflow cross-section resulting from the passage cross-section of the individual inner tube and a cylinder-casing-like outflow cross-section of that part of an annular space associated with the respective inner tube.

The greatest possible reduction in the mechanical load of the product during its merging into a total flow (outlet losses during merging) is achieved in an unpredictable manner when, as provided by a further implementation, the inner tubes lead on the end side respectively into and flush with a floor of an inlet groove, which engages from the side of the second exchanger flange in the shape of an annular recess into the second tube carrier plate. The floor is thereby distanced from the front surface of the second tube carrier plate by a recess, which also simultaneously determines the depth of the inlet groove.

Outlet losses are thereby further reduced in that the inlet groove preferably tapers symmetrically and continuously to the outside diameter of the respective inner tube, preferably with a concave surface.

The outlet losses from the inner tubes are minimized when the respective inner tube is received in a connection bore hole in the floor of the inlet groove, which is countersunk in the shape of an inlet hopper engaging in the inlet groove and tapering continuously towards the inner tube. The shape design of the inlet hopper is thereby preferably tulip-shaped, cone-shaped, conical, or coniform.

The transition between the annular space-like outlet channel in the second exchanger flange and the inlet groove in the second tuber carrier plate is designed particularly beneficially from a flow perspective when the extended outlet-side passage cross-section with its inside diameter transitions flush and continuously into an outside flank, and when the displacement foot with its outside diameter designed on the end side transitions flush and continuously into an inside flange of the inlet groove.

An advantageous embodiment of the apparatus provides that the inlet side of the tube bundle heat exchanger is designed such that the first connection opening, seen in the direction of flow, in the first exchanger flange extends axially symmetrically and radially and continues up to an extended inlet-side passage cross-section provided on the end side and produces a fluid-accessible connection to the inner tubes, that an axially symmetrical inlet-side displacement body is arranged coaxially to the first connection opening and concentrically to the first tube carrier plate and is permanently connected with it, and that the inlet-side displacement body together with an inlet-side inner contour formed by the first connection opening and its radial extension up to the extended inlet-side passage cross-section forms an annular space-like inlet channel. In this respect, this design is adequate for the design on the outlet side; however, the annular space-like inlet channel is subject to different measurement criteria, for example suggested in WO 2011/085784 A2.

The apparatus according to embodiments of the invention is particularly suitable and advantageous when used for temperature-sensitive and/or viscous products in the dairy industry, for example desserts, sauces or concentrates.

BRIEF DESCRIPTION OF THE DRAWINGS

A more detailed representation of the invention results from the following description and the attached figures of the drawing as well as from the claims. While the invention is realized in various embodiments, two preferred embodiments of the apparatus are shown in the drawing and described below according to structure and function.

DETAILED DESCRIPTION

Figure 1:
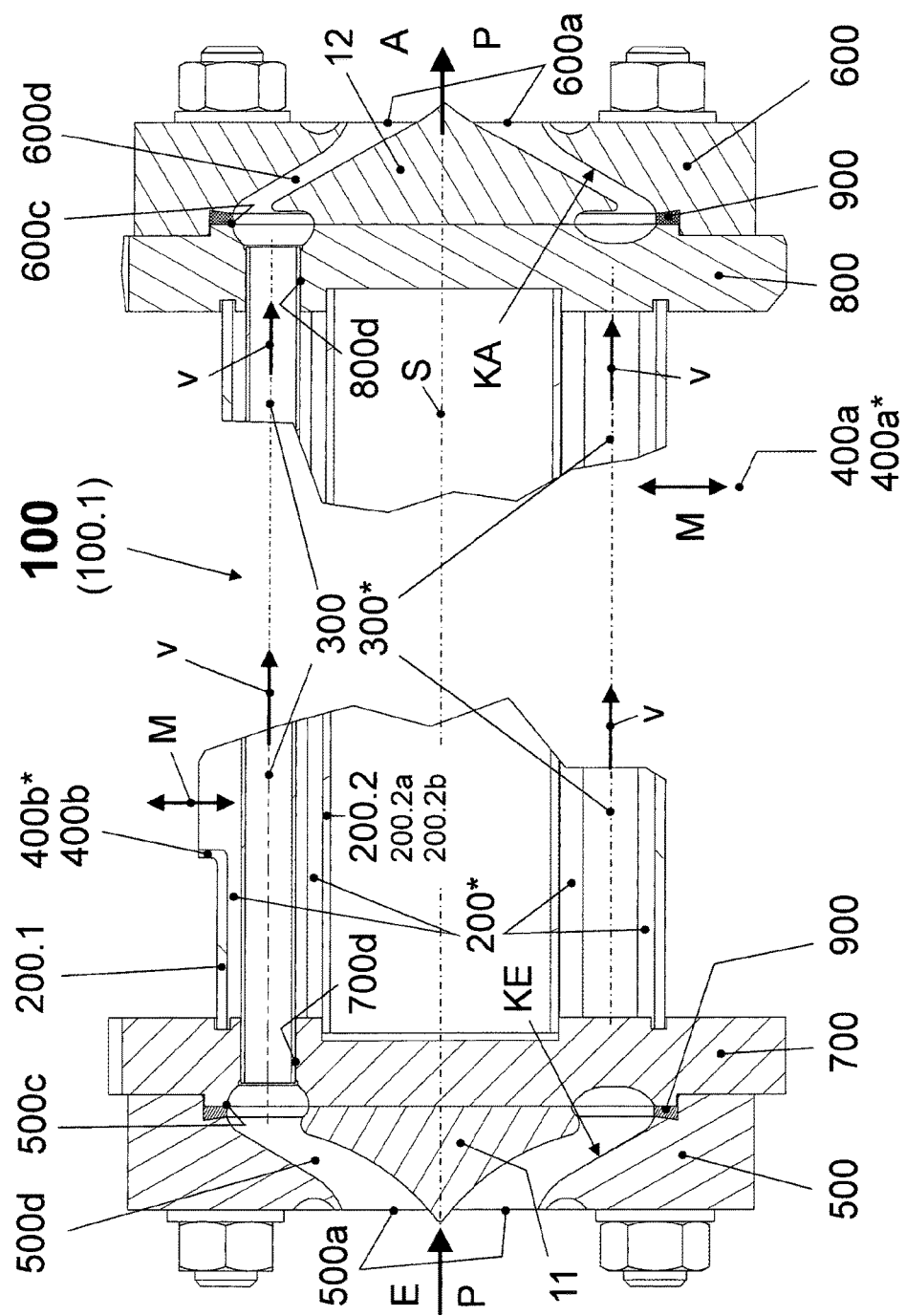
FIG. 1 is a meridian section view of a first embodiment of the apparatus, realized on a preferably used tube bundle heat exchanger, wherein the representation is limited to the inlet- and outlet-side region of the tube bundle heat exchanger.

A tube bundle heat exchanger 100, of which a tube bundle 100.1 is shown, has in a first embodiment congruent flow paths between a product inlet E penetrated by an entire product P and a product outlet A (see FIG. 1) for all partial quantities of product P branching and merging between the product inlet E and the product output A. This is achieved in that a group of inner tubes 300 connected in parallel and flowed through by the product on the inside that form the tube bundle 100.1 are arranged in a circular-ring-shaped manner, on a single circle K (FIG. 2) and in an outer channel 200* designed as an annular space and extend in its longitudinal direction, and are each supported on the end side in a first and a second tube carrier plate 700, 800. The inner tubes 300 are arranged in the largest possible circumferential area of the tube carrier plate 700, 800, preferably evenly distributed over the perimeter of the circle K. A number N of inner tubes 300 extending through the outer channel 200* axially parallel to an outer casing 200.1 of the outer channel 200* and together forming an inner channel 300* passes through the first tube carrier plate 700 and the second tube carrier plate 800 on the end side (both are also called tube sheet plates) and is welded there on its respective tube outside diameter and on its respective front surface. The product inlet E is designed in a first exchanger flange 500, which is associated with the first tube carrier plate 700, and the product outlet A is designed in a second exchanger flange 600, which is associated with the second tube carrier plate 800.

As a rule, the tube bundle heat exchanger 100 is made up of more than one tube bundle 100.1. The tube bundle 100.1 consists in its center part of the outer casing 200.1 bordering the outer channel 200* with, relative to the representation position, the first tube carrier plate 700 arranged on the left side and the tube carrier plate 800 arranged on the right side in the same manner. In the region of the right-side end of the outer casing 200.1, a first transverse channel 400a* leading into a first connecting piece 400a is provided on the first connecting piece 400a, and, in the region of the left-side end of the outer casing 200.1, a second transverse channel 400b* leading into a second connecting piece 400b is provided on the second connecting piece 400b for addition of a heating medium M.

The outer channel 200* for the heating medium M is delimited on the outside by the outer casing 200.1 and is delimited on the inside by an inner casing 200.2. The inner channel 300* is connected on one side with the product inlet E common for all inner tubes 300 and on the other side with the product outlet A common for all inner tubes 300. A first and a second connection opening 500a, 600a is arranged centrically in the first and in the second exchanger flange 500, 600 on its flange side facing away from the associated tube carrier plate 700, 800. The second connection opening 600a extends opposite the direction of flow, axially symmetrically and radially in the second exchanger flange 600, continues up to an extended outlet-side passage cross-section 600c provided on the end side, and establishes a fluid-accessible connection to the inner tubes 300. An axially symmetrical outlet-side displacement body 12 is arranged coaxially to the second connection opening 600a and concentrically to the second tube carrier plate 800 and is permanently connected with the second tube carrier plate 800. The axially symmetrical outlet-side displacement body 12 forms an annular space-like outlet channel 600d with an outlet-side inner contour KA formed by the second connection opening 600a and its radial extension up to the extended outlet-side passage cross-section 600c.

Depending on the arrangement of the respective tube bundle 100.1 in the tube bundle heat exchanger 100 and its respective wiring, the inner tubes 300, with respect to the representation position, can be flowed through by product P either from left to right or vice versa, wherein an average flow speed in the inner tube 300 and thus in the inner channel 200* are labeled with v. The components, which determine the inlet- and outlet-specific conditions, then change their position accordingly. The cross-section-like design of the inner tube 300 generally takes place such that the average flow speed v is at least equal to or greater than a first flow speed v0 in a connection bend 1000 (FIG. 4), which can end on one side in the first exchanger flange 500 and on the other side in the second exchanger flange 600. The first exchanger flange 500 is sealed against the tube carrier plate 700 via a flange seal 900. The same goes for the second exchanger flange 600 and the second tube carrier plate 800.

In the first embodiment, the end-side regions of the tube bundle heat exchanger 100, with the exception of an inlet- and the outlet-side displacement body 11, 12 respectively connecting to the outer channel 200*, are preferably designed as mirror images of each other and with the same dimensions so that the following detailed description can primarily be limited to the outlet-side end region and the corresponding reference numbers of the other end region are only cited. The structure of the inlet-side region can be developed analogously from the structure of the outlet-side region. The exchanger flange 600, 500 has, on its side facing away from the associated tube carrier plate 800, 700, the connection opening 600a, 500a, which has a nominal diameter DN and thus corresponds with a nominal passage cross-section AO of the connection bend 1000 connected there (FIG. 4) (AO=DN2$\pi$/4).

The connection opening 600a, 500a opens in the exchanger flange 600, 500 axially symmetrically via a transition 600b (a corresponding transition is not labeled in 500) up to the extended outlet-side passage cross-section 600c provided on the end side or respectively an extended inlet-side passage cross-section 500c. The extended passage cross-section 600c, 500c is designed mainly cylindrically with an inner diameter D1 (maximum diameter of the extended passage cross-section 600c, 500c) (FIGS. 2, 2a), and the extended passage cross-section 600c forms, together with the transition 600b, the outlet-side inner contour KA in the second exchanger flange 600 and the extended passage cross-section 500c forms, together with the corresponding transition in the first heat exchanger flange 500, an inlet-side inner contour KE in the first exchanger flange 500. The inlet-side inner contour KE forms with the inlet-side displacement body 11 an annular space-like inlet channel 500d in a generally known manner.

Figure 2:
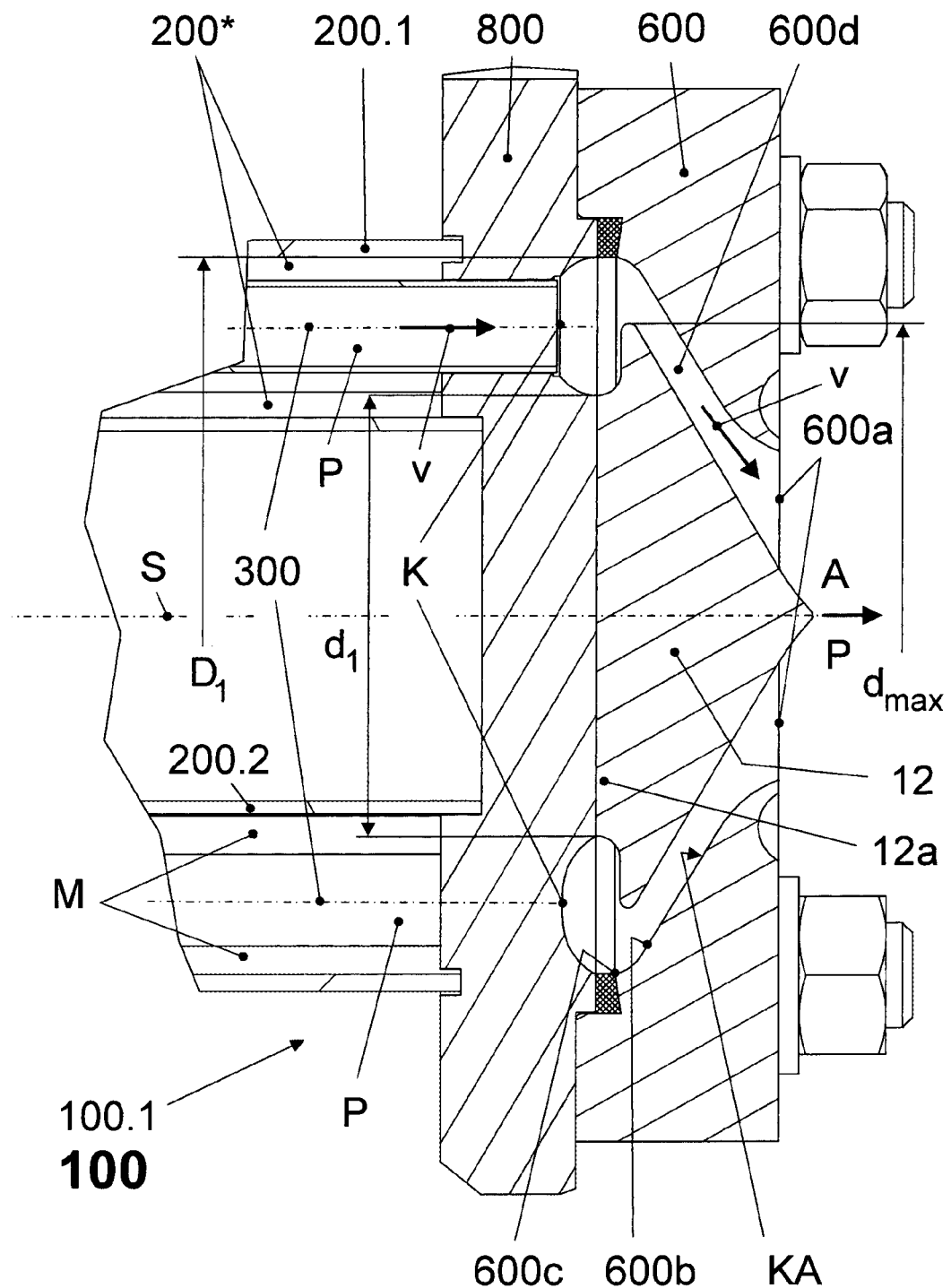
FIG. 2 is a meridian section view in an enlarged representation of the outlet-side region according to FIG. 1.
Figure 2A:
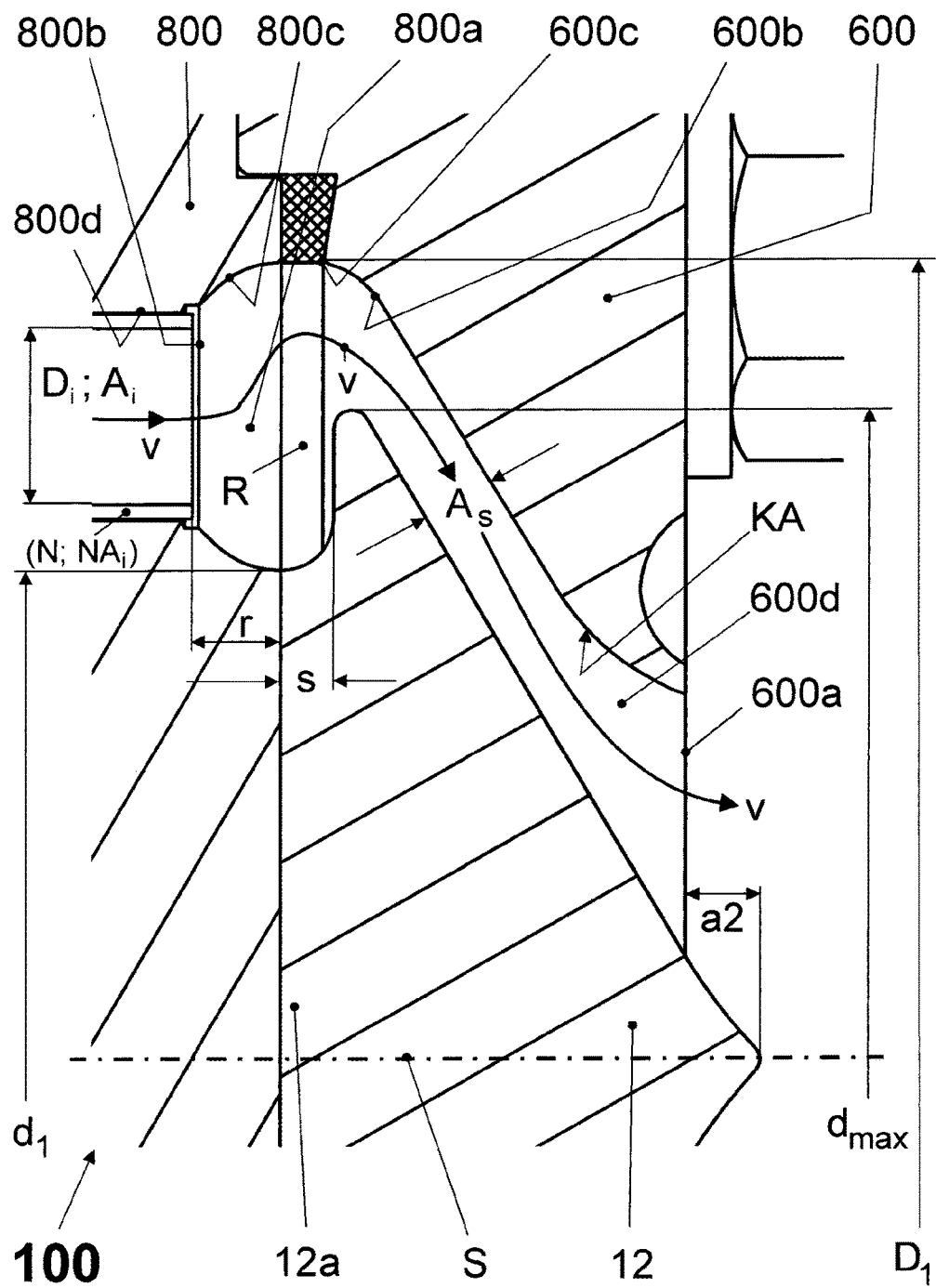
FIG. 2a is an even more enlarged representation of a section of the meridian cut according to FIG. 2 in the region of an annular space-like outlet channel in connection with a transition region to an outlet from an inner tube.

The below description is limited to the outlet side of the tube bundle 100.1. The axially symmetrical outlet-side displacement body 12 is provided coaxially to the second connection opening 600a and concentrically to the second tube carrier plate 800 (FIGS. 1, 2, 2a, 3), the displacement body 12 forming forms the annular space-like outlet channel 600d with the outlet-side inner contour KA formed by the second connection opening 600a, the transition 600b and the extended outlet-side passage cross-section 600c. The annular space-like outlet channel 600d has, at least everywhere in its region between a maximum diameter dmax of the outlet-side displacement body 12 and the second connection opening 600a, a channel diameter cross-section AS (FIG. 2a), which has a constant passage cross-section over the entire length of the defined region and which corresponds in this region with a total passage cross-section NAi of all inner tubes 300 flowed through in parallel of the number N. Inner tubes 300 have respectively an individual passage cross-section Ai (AS=const). The individual passage cross-section is thereby calculated with $Ai=Di2\pi/4$, wherein Di is the tube inner diameter of the inner tubes 300. The maximum outside diameter dmax of the outlet-side displacement body 12 reaches at least up to the diameter of the circle K (FIGS. 2, 2a).

The outlet-side displacement body 12 is designed in a mushroom-shaped manner and it ends with a displacement foot 12a directly at the second tube carrier plate 800. The maximum outside diameter dmax of the outlet-side displacement body 12 is reduced to an outside diameter di of the displacement foot 12a in a plane perpendicular to a symmetry axis S of the outlet-side displacement body 12, wherein the transition region is preferably sufficiently rounded out (FIG. 2a).

The annular space-like outlet channel 600d merges into an annular space R at its extended passage cross-section 600c within the second exchanger flange 600, the annular space R being oriented coaxially to the symmetry axis S, being flush radially outside with the inner diameter D1 of the of the extended outlet-side passage cross-section 600c, reaching radially inwards up to the displacement foot 12a, and being delimited laterally by an annular surface formed between the displacement foot 12a and the maximum outside diameter dmax of the outlet-side displacement body 12. The annular space R has an axial annular space width s, which preferably corresponds with at least one-fourth of a tube inner diameter Di of the inner tube 300 (FIG. 2a; s=Di/4; from the continuity condition $Ai=Di2\pi/4=Di\pi s$).

The inner tubes 300 lead on the end side respectively into and flush with a floor 800b of an inlet groove 800a (FIG. 2a), which engages from the side of the second exchanger flange 600 in the shape of an annular recess into the second tube carrier plate 800. The floor 800b is distanced from the front surface of the second tube carrier plate 800 by a recess r. The inlet groove 800a tapers continuously, preferably symmetrically to the outside diameter of the respective inner tube 300, wherein a concave tapering is preferred.

A second and a first connection bore hole 800d, 700d (FIGS. 2a, 1) are provided for receiving the respective end of the inner tube 300 in the tube carrier plate 800, 700, wherein the second connection bore hole leads into the floor 800b (FIG. 2a). The second connection bore hole 800d is preferably countersunk in the shape of an inlet hopper 800c engaging in the inlet groove 800a and tapering continuously towards the inner tube 300. The extended outlet-side passage cross-section 600c merges with its inner diameter D1 preferably flush and continuously into an outside flank and the outlet-side displacement foot 12a merges with its outside diameter d1 designed on the end side preferably flush and continuously into an inside flank of the inlet groove 800a (FIG. 2a).

A preferred embodiment according to FIGS. 1 to 4 provides that the outer channel 200* designed as an annular space is delimited on the inside by the inner casing 200.2 in the shape of an inner tube 200.2a, which is supported respectively on the end side in the tube carrier plate 700, 800. A further embodiment provides that the outer channel 200* designed as an annular space is delimited on the inside by the inner casing 200.2 in the shape of an inner rod 200.2b, which is supported respectively on the end side in the tube carrier plate 700, 800.

Figure 3:
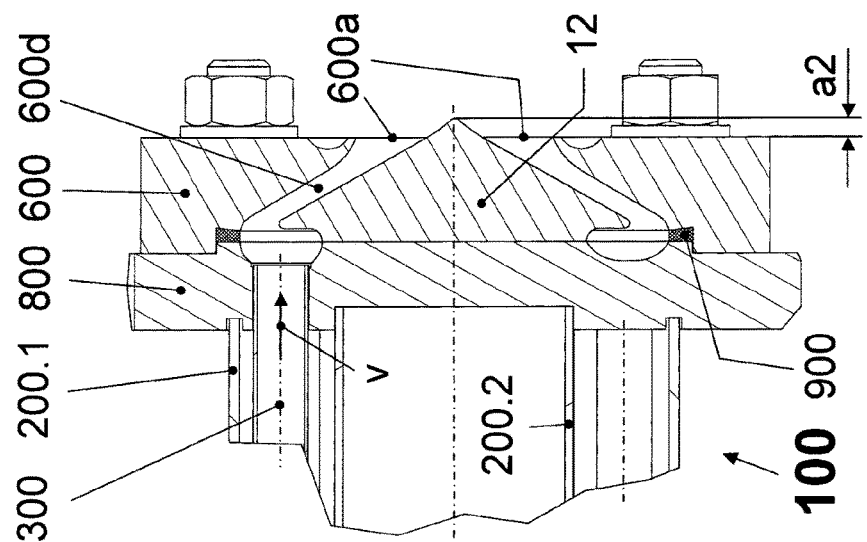
FIG. 3 is a meridian section view of the first embodiment according to FIG. 2 compared to a second embodiment according to FIG. 4.
Figure 4:
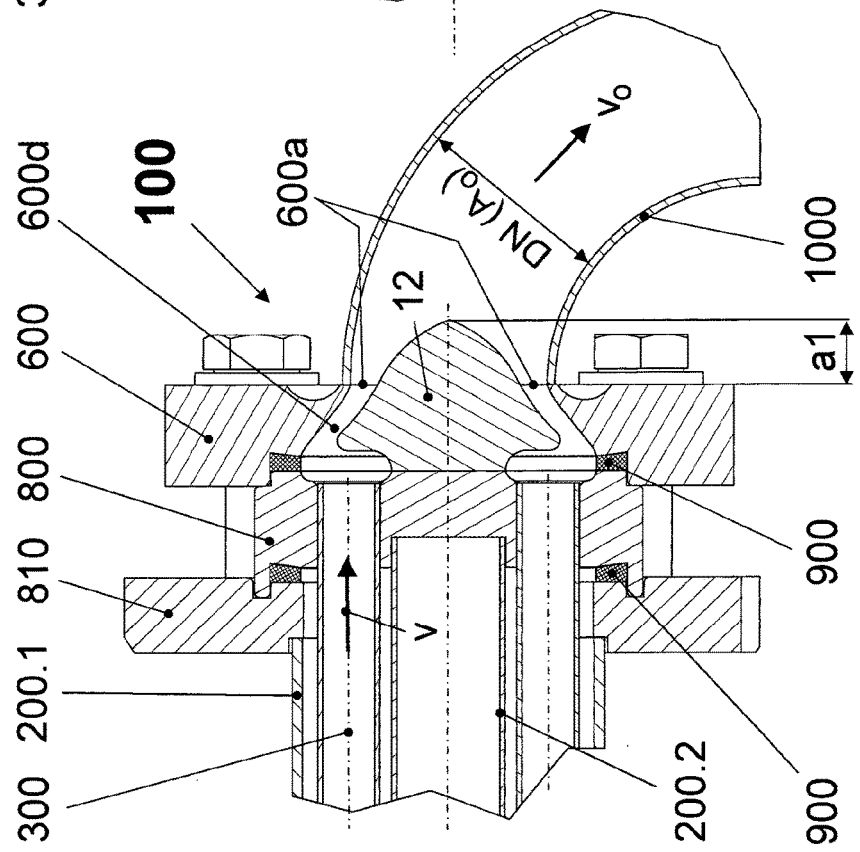
FIG. 4 shows, in a meridian section view, an outlet-side displacement body modified with respect to FIG. 3 and a modified second tube carrier plate.

FIG. 4 shows a second embodiment of the apparatus according to the invention, wherein here, in contrast to the first embodiment according to FIG. 3, the second tube carrier plate 800, and if applicable also the first tube carrier plate 700, only serve to receive the inner tubes 300, and a third exchanger flange 810 is provided for receiving the outer casing 200.1. The second tube carrier plate 800 is, as described above, sealed on one side with respect to the second exchanger flange by means of the flange seal 900 and on the other side with respect to the third exchanger flange 810 by means of a further flange seal 900. The outlet-side displacement body 12 is designed larger than in the first embodiment according to FIG. 3, and it engages in the connection bend 1000 connected to the second exchanger flange 600 by an axial first depth of engagement al, which is designed considerably larger than an axial second depth of engagement a2 according to FIG. 3. The flow-mechanical efficacy of this calculation was described above.

A reference list for the abbreviations and drawing labels is as follows:
11 Inlet-side displacement body
12 Outlet-side displacement body
12a Displacement foot
100 Tube bundle heat exchanger, general
100.1 Tube bundle
200* Outer channel
200.1 Outer casing
200.2 Inner casing
200.2a Inner tube (inner casing)
200.2b Inner rod (inner casing)
300* Inner channel
300 Inner tube
400a First connecting piece
400a* First transverse channel
400b Second connecting piece
400b* Second transverse channel
500 First exchanger flange
500a First connection opening
500c Extended inlet-side passage cross-section
500d Annular space-like inlet channel 600 Second exchanger flange
600a Second connection opening
600b Transition
600c Extended outlet-side passage cross-section
600d Annular space-like outlet channel
700 First tube carrier plate (tube sheet plate)
700d First connection bore hole
800 Second tube carrier plate (tube sheet plate)
800a Inlet groove
800b Floor
800c Inlet hopper
800d Second connection bore hole
810 Third exchanger flange
900 Flange seal
1000 Connection bend/connection fitting
$a_1$ First depth of engagement
$a_2$ Second depth of engagement
$d_1$ Outside diameter (displacement foot 12a)
$d_{max}$ Maximum outside diameter (displacement foot 12a)
r Recess (of the inner tube 300)
s Axial annular space width ($s=D_i/4$; from $A_i=D_i^2\pi/4=D_i\pi s$)
v Average flow speed (in the inner tube 300 and in the annular-space-like outlet channel 600d)
$v_0$ First flow speed (in the connection bend 1000; $v_0=v$)
A Product outlet
$A_i$ Individual passage cross-section (of the inner tube ($A_i=D_i^2\pi/4$))
$NA_i$ Total passage cross-section (of all inner tubes flowed through in parallel)
$A_s$ Channel passage cross-section ($A_s$=const)
$A_O$ Nominal passage cross-section (of the connection bend; $A_O=DN^2\pi/4$)
$D_i$ Tube inner diameter (inner tube 300)
$D_1$ Inner diameter (of the extended passage cross-section 600c)
DN Nominal diameter (of the connection bend ($A_O=DN^2\pi/4$))
E Product inlet
K Circle
KA Outlet-side inner contour
KE Inlet-side inner contour
M Heating medium
N Number (of inner tubes 300)
P Product (food product)
R Annular space
S Symmetry axis

The invention claimed is:

1. An apparatus for influencing an outflow region of a tube carrier plate of a tube bundle heat exchanger, in particular for the food and beverage industry, comprising:
a tube bundle of the tube bundle heat exchanger, the tube bundle comprising inner tubes connected in parallel and respectively flowed through by a product on the inside, the inner tubes arranged in a circular-ring-shaped manner on a single circle and in an outer channel designed as an annular space extending in the longitudinal direction thereof and the inner tubes supported respectively on an end side in a first and a second tube carrier plate;
an outer casing delimiting the outer channel from an outside and an inner casing delimiting the outer channel from an inside for a heating medium, with a number of the inner tubes together forming an inner channel;
a product inlet designed for the inner tubes together and located on one side of the inner tubes in a first exchanger flange;
a common product outlet for the product designed on the other side of the inner tubes in a second exchanger flange;
a first connection opening arranged centrically in the first exchanger flange on its flange side facing away from the first tube carrier plate;
a second connection opening arranged centrically in the second exchanger flange on its flange side facing away from the second tube carrier plate, the second connection opening extending axially symmetrically and radially opposite a direction of flow in the second exchanger flange, continuing up to an extended outlet-side passage cross-section on an end side of the second exchanger flange, and establishing a fluid-accessible connection to the inner tubes; and
an axially symmetrical outlet-side displacement body fixedly connected coaxially to the second connection opening and concentrically to the second tube carrier plate, the axially symmetrical outlet-side displacement body forming an annular space-like outlet channel together with an outlet-side inner contour formed by the second connection opening and its radial extension up to the extended outlet-side passage cross-section; and
the annular space-like outlet channel having a channel passage cross-section in an entirety of a region of the annular space-like outlet channel between a maximum outside diameter of the outlet-side displacement body and the second connection opening, the channel passage cross-section having a constant passage cross-section over an entire length of the region and corresponding in the region with a total passage cross-section of the inner tubes of the number that are flowed through in parallel, each of the inner tubes having an individual passage cross-section.

2. The apparatus according to claim 1, wherein:
the maximum outside diameter of the outlet-side displacement body reaches at least up to a diameter of the single circle.

3. The apparatus according to claim 1, wherein:
the inner tubes of the tube bundle are arranged in the largest possible circumferential area of the first and the second tube carrier plate.

4. The apparatus according to claim 1, wherein:
the inner tubes of the tube bundle are arranged evenly distributed over a perimeter of the single circle.

5. The apparatus according to claim 1, wherein:
the outer channel designed as an annular space is delimited on the inside by the inner casing shaped as an inner tube that is supported respectively on the end side in the first and the second tube carrier plate.

6. The apparatus according to claim 1, wherein:
the outer channel designed as an annular space is delimited on the inside by the inner casing shaped as an inner rod that is supported respectively on the end side in the first and the second tube carrier plate.

7. The apparatus according to claim 1, wherein:
the outlet-side displacement body is designed in a mushroom-like manner;
the outlet-side displacement body ends with a displacement foot directly at the second tube carrier plate; and
the maximum outside diameter of the outlet-side displacement body is reduced to an outside diameter of the displacement foot in a plane perpendicular to a symmetry axis of the outlet-side displacement body.

8. The apparatus according to claim 7, wherein:
the annular space-like outlet channel merges into an annular space at the extended outlet-side passage cross-section within the second exchanger flange, the annular space being oriented coaxially to the symmetry axis, being flush on the radial outside with an inner diameter of the extended outlet-side passage cross-section, reaching on the radial inside up to the displacement foot and being delimited laterally by an annular surface formed between the displacement foot and the maximum outside diameter of the outlet-side displacement body; and
the annular space has an axial annular space width that corresponds at least with a fourth of a tube inner diameter of an inner tube of the inner tubes.

9. The apparatus according to claim 1, wherein:
the inner tubes lead on the end side in the second tube carrier plate respectively into and flush with a floor of an inlet groove that engages into the second tube carrier plate from a side of the second exchanger flange in the shape of an annular recess; and
the floor is distanced from a front surface of the second tube carrier plate by a recess.

10. The apparatus according to claim 9, wherein:
the inlet groove tapers continuously and symmetrically towards an outside diameter of a respective inner tube.

11. The apparatus according to claim 9, wherein:
a respective inner tube is received in a connection bore hole in the floor, which is countersunk in a shape of an inlet hopper engaging in the inlet groove and tapering continuously towards the respective inner tube.

12. The apparatus according to claim 7, wherein:
the extended outlet-side passage cross-section, with its inner diameter, merges flush and continuously into an outside flank; and
the displacement foot, with its outside diameter designed on the end side in the second tube carrier plate merges flush and continuously into an inside flank of the inlet groove.

13. The apparatus according to claim 1, wherein:
the first connection opening, seen in the direction of flow, extends axially symmetrically and radially in the first exchanger flange and continues up to an extended inlet-side passage cross-section provided on the end side in the second tube carrier plate and establishes a fluid-accessible connection to the inner tubes;
an axially symmetrical inlet-side displacement body is arranged coaxially to the first connection opening and concentrically to the first tube carrier plate and is fixedly connected with the first tube carrier plate; and
the inlet-side displacement body forms an annular space-like inlet channel together with an inlet-side contour formed by the first connection opening and the radial extension up to the extended inlet-side passage cross-section.

14. The apparatus according to claim 13, wherein:
the first and the second exchanger flange and the first and the second tube carrier plate are designed identical in shape and dimension.

15. A use of an apparatus according to claim 1 for products in the dairy industry that are at least one of temperature-sensitive or viscous.

* * * * *